US012584329B1

(12) United States Patent
Machado

(10) Patent No.: US 12,584,329 B1
(45) Date of Patent: Mar. 24, 2026

(54) EQUIPMENT CABINET DOOR HANDLE KEY COVER

(71) Applicant: Florida Power & Light Company, Juno Beach, FL (US)

(72) Inventor: Christopher J. Machado, Cutler Bay, FL (US)

(73) Assignee: Florida Power & Light Company, Juno Beach, FL (US)

( * ) Notice: Subject to any disclaimer, the term of this patent is extended or adjusted under 35 U.S.C. 154(b) by 46 days.

(21) Appl. No.: 18/901,821

(22) Filed: Sep. 30, 2024

(51) Int. Cl.
*E05B 13/00* (2006.01)

(52) U.S. Cl.
CPC .................................. *E05B 13/001* (2013.01)

(58) Field of Classification Search
CPC .... E05B 13/001; E05B 13/002; E05B 1/0061; E05B 17/188; E05B 65/0014; E05B 77/34; E05B 13/00; Y10T 70/8649; Y10S 292/02
See application file for complete search history.

(56) References Cited

U.S. PATENT DOCUMENTS 2,132,287 A 10/1938 Curtis et al.
2,140,239 A 12/1938 Lewis
2,217,730 A 10/1940 Cooley
2,247,592 A 7/1941 Swift
2,610,877 A 9/1952 Weaver
2,690,071 A * 9/1954 Jacobi .................. E05B 17/181 70/455
3,754,423 A 8/1973 Seidewand
(Continued)

FOREIGN PATENT DOCUMENTS

CN 218597950 3/2023
DE 4321189 1/1995
(Continued)

OTHER PUBLICATIONS

IND Painted Keyhole Cover—F80 M3 | F82/ F83 M4. (n.d.). AutoTecknic USA. https://autotecknic.com/collections/automotive/products/ind-f8x-m3-m4-painted-key-hole-cover.
(Continued)

*Primary Examiner* — Christine M Mills
*Assistant Examiner* — Faria F Ahmad
(74) *Attorney, Agent, or Firm* — TROUTMAN PEPPER LOCKE LLP; Dustin B. Weeks

(57) ABSTRACT

A key cover for an equipment cabinet door handle comprising a hollow cylindrical-shaped body with a circumferential sidewall of a given perimeter. The hollow cylindrical-shaped body includes a top end and a bottom end. The top end has an axial opening therein, forming a top rim and defining sidewall thickness between an inner radius and an outer radius. The inner radius is smaller than the outer radius, the circumferential sidewall has a substantially rectangular-shaped opening formed around the given perimeter, and the substantially rectangular-shaped opening has a first arcuate length. A top portion of the circumferential sidewall at the top end forms a finger protrusion with a fingertip with a second arcuate length into the substantially rectangular-shaped opening. The bottom portion of the circumferential sidewall at the bottom end forms a curb with a third arcuate length in the substantially rectangular opening.

20 Claims, 7 Drawing Sheets

(56) References Cited

U.S. PATENT DOCUMENTS

| | | | | | |
|---|---|---|---|---|---|
| 4,007,956 | A * | 2/1977 | Harris | E05B 13/001 292/357 |
| 4,876,867 | A * | 10/1989 | Leneave | E05B 13/001 70/420 |
| 4,899,564 | A * | 2/1990 | Gilbert | E05B 13/001 70/424 |
| D349,034 | S * | 7/1994 | Webster | D8/333 |
| 6,371,155 | B1 * | 4/2002 | Balocca | E03C 1/041 137/382 |
| D499,328 | S | 12/2004 | Spoon | |
| D526,557 | S | 8/2006 | Falconer et al. | |
| 7,334,824 | B2 | 2/2008 | Sundberg et al. | |
| 8,022,299 | B2 | 9/2011 | Zheng | |
| D808,246 | S | 1/2018 | Blankenship | |
| 10,422,157 | B1 * | 9/2019 | Lindstead | E05B 1/0053 |
| 11,203,884 | B2 | 12/2021 | Marsden | |
| 11,371,259 | B2 | 6/2022 | Wesley | |
| D956,507 | S * | 7/2022 | Elser | D8/307 |
| D1,025,742 | S | 5/2024 | Li | |
| 2004/0183315 | A1 | 9/2004 | O'Donohoe | |
| 2004/0256862 | A1 * | 12/2004 | Wong | E05B 13/002 292/165 |
| 2007/0007778 | A1 * | 1/2007 | Gomes | E05B 1/0053 292/336.3 |
| 2010/0199727 | A1 * | 8/2010 | Varney | E05B 13/00 292/336.3 |

FOREIGN PATENT DOCUMENTS

| | | |
|---|---|---|
| DE | 20115681 | 1/2002 |
| EP | 2072718 | 2/2010 |
| FR | 2819539 | 7/2002 |
| WO | 2013114224 | 8/2013 |
| WO | 2023212561 | 11/2023 |

OTHER PUBLICATIONS

Lever LockTM. (n.d.). https://www.dreambaby.com/lever-door-lock.html.

Master Lock® Rotating Gate Valve Lockout, 1" To 3" Diameter Handles, 480. (n.d.-b). https://www.globalindustrial.com/p/master-lock-rotating-gate-valve-lockout-1-to-3-diameter? msclkid=7c4b80a256011a50d9c1e61858aef8c8&utm_source=bing&utm_medium=cpc&utm_campaign=%5BADL%5D%20%5BPLA%5D%20%5BtROAS%5D%20(Safety%20%26%20Security%20-%20Prime)%20-%20%7BT07D&utm_term=4582627080926150&utm_content=(Safety%20%26%20Security%20-%20Locks%20%26%20Lockout%.

* cited by examiner (Top)

(Bottom toward Cabinet)

EQUIPMENT CABINET DOOR HANDLE KEY COVER

FIELD OF THE DISCLOSURE

The present disclosure generally relates to an equipment cabinet door handle key cover.

BACKGROUND

Redundancy in nuclear power plant systems is a critical design principle implemented to enhance safety and reliability. By incorporating multiple layers of backup systems and components, redundancy ensures that the failure of a single element does not lead to unplanned downtime. For example, key safety systems such as the reactor cooling systems, emergency power supplies, and containment structures are often duplicated or even triplicated. This means that if one system fails, another can immediately take over, thereby maintaining the plant's continuous operation. Redundancy is meticulously planned and tested to ensure that there is always a reliable safeguard in place.

Moreover, redundancy in nuclear power plants extends beyond physical systems to include procedural and operational aspects. Operators are trained to follow strict protocols that involve multiple checks and verifications, often requiring independent confirmation from different team members before critical actions are taken. This procedural redundancy minimizes human error and ensures that safety measures are consistently and correctly applied. Additionally, redundant monitoring and control systems allow for continuous oversight of plant operations, quickly detecting and responding to any anomalies. Together, these layers of redundancy create a robust safety net, significantly reducing the risk of accidents and enhancing the overall security of nuclear power operations.

During maintenance, only one redundant system is typically serviced at a time to minimize triggering an unplanned plant shutdown. Redundant systems may be easily confused.

SUMMARY OF THE INVENTION

Disclosed is a novel equipment cabinet door handle key cover for an equipment cabinet. The equipment cabinet door handle key cover twists onto the door latch handle to designate the equipment is not targeted for maintenance service, e.g., "guarded equipment," in order to prevent entering the incorrect cabinet by mistake.

The equipment cabinet door handle key cover comprises a hollow cylindrical-shaped body with a circumferential sidewall, a top end, and a bottom end. The top end has an axial opening therein, forming a top rim and defining sidewall thickness between an inner radius and an outer radius. The inner radius is smaller than the outer radius, and the circumferential sidewall has a substantially rectangular-shaped opening formed with a first arcuate length. The substantially rectangular-shaped opening includes a top portion of the circumferential sidewall at the top end, forming a finger protrusion with a fingertip with a second arcuate length into the substantially rectangular-shaped opening. A bottom portion of the circumferential sidewall at the bottom end forms a curb with a third arcuate length in the substantially rectangular-shaped opening. The arithmetic sum of the second arcuate length and the third arcuate length is less than or equal to the first arcuate length. A cap is formed on the bottom end.

In one example, the hollow cylindrical-shaped body and the cap are formed as a unitary piece using a single mold or additive manufacturing process. In another example, the hollow cylindrical-shaped body and the cap are formed from one or more pieces.

The hollow cylindrical-shaped body and the cap may include an outer surface that is bright in color, such as yellow, orange or red. Moreover, the outer surface of the cap may include text.

Other features and advantages of the invention will become apparent to those skilled in the art upon review of the following detailed description, claims, and drawings.

BRIEF DESCRIPTION OF THE DRAWINGS

The accompanying figures, where like reference numerals refer to identical or functionally similar elements throughout the separate views, and which together with the detailed description below are incorporated in and form part of the specification, serve to further illustrate various embodiments and to explain various principles and advantages all in accordance with the present disclosure, in which.

DETAILED DESCRIPTION

Figure 1:
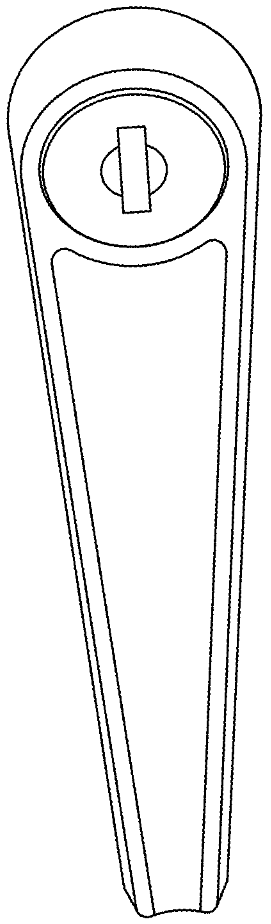
(PRIOR ART) FIG. 1
FIG. 1 is a front view of an equipment cabinet door handle with a key lock, according to the prior art.

As required, detailed embodiments are disclosed herein; however, it is to be understood that the disclosed embodiments are merely examples and that the systems and methods described below can be embodied in various forms. Therefore, specific structural and functional details disclosed herein are not to be interpreted as limiting but merely as a basis for the claims and as a representative basis for teaching one skilled in the art to variously employ the disclosed subject matter in virtually any appropriately detailed structure and function. Further, the terms and phrases used herein are not intended to be limiting but rather to provide an understandable description.

Non-Limiting Definitions

The terms “a” or “an”, as used herein, are defined as one or more than one. The term plurality, as used herein, is defined as two or more than two.

The term “adapted to” describes the hardware, software, or a combination of hardware and software that is capable of, able to accommodate, to make, or that is suitable to carry out a given function.

The term “another”, as used herein, is defined as at least a second or more.

The term “cabinet” is used to mean any enclosed structure that houses and organizes electrical equipment, plumbing equipment, electro-mechanical equipment, networking equipment and related hardware. In one example, a “cabinet” is a weatherproof box that protects internal components from damage and environmental conditions.

The term “configured to” describes hardware, software or a combination of hardware and software that is adapted to, set up, arranged, built, composed, constructed, designed, or that has any combination of these characteristics to carry out a given function.

The term “coupled,” as used herein, is defined as “connected,” although not necessarily directly, and not necessarily mechanically.

The terms “including” and “having,” as used herein, are defined as comprising (i.e., open language).

The term “or” is intended to mean an inclusive “or” rather than an exclusive “or.” That is, unless specified otherwise or clear from context, “X employs A or B” is intended to mean any of the natural inclusive permutations. That is, if X employs A; X employs B; or X employs both A and B, then “X employs A or B” is satisfied under any of the foregoing instances. In addition, the articles “a” and “an” as used in this application and the appended claims should generally be construed to mean “one or more” unless specified otherwise or clear from context to be directed to a singular form.

It should be understood that the steps of the methods set forth herein are not necessarily required to be performed in the order described, and the order of the steps of such methods should be understood to be merely exemplary. Likewise, additional steps may be included in such methods, and certain steps may be omitted or combined in methods consistent with various embodiments of the present device.

Overview

An equipment cabinet door handle key cover twists onto the door latch handle to designate the equipment within the equipment cabinet is not targeted for maintenance service, e.g., “guarded equipment,” in order to prevent entering the incorrect cabinet by mistake.

Commercially Available Equipment Cabinet Door Handle with Key Lock

FIG. 1 is a front view of a commercially available equipment cabinet door handle with a key lock. This type of equipment cabinet in a nuclear power plant often has identical equipment cabinets nearby with redundant components such as controllers, power supplies, and other electrical and electro-mechanical components.

Figure 2:
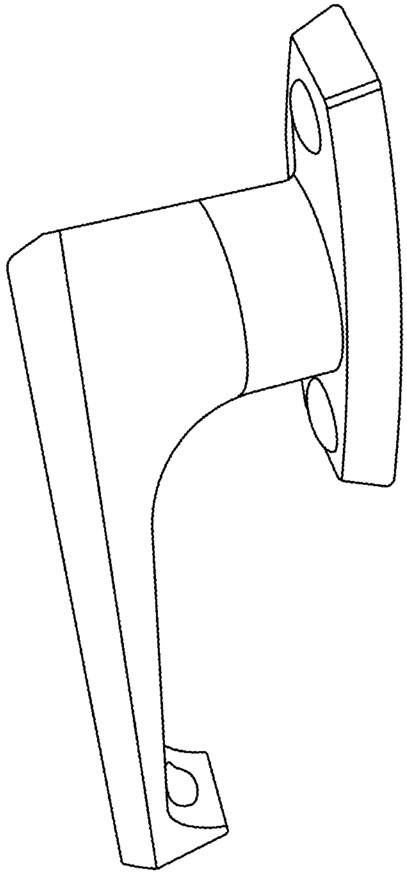
(PRIOR ART) FIG. 2
FIG. 2 is a side view of an equipment cabinet door handle with key lock of FIG. 1, according to the prior art.

FIG. 2 is a corresponding side view of an equipment cabinet door handle with key lock of FIG. 1. When technicians service components inside an equipment cabinet, it is easy to confuse which cabinet houses the primary components and which cabinet houses the backup components since the equipment cabinets in most cases are identical.

Equipment Cabinet Door Handle Key Cover—Mechanical/Solid Surface Drawings

Figure 3:
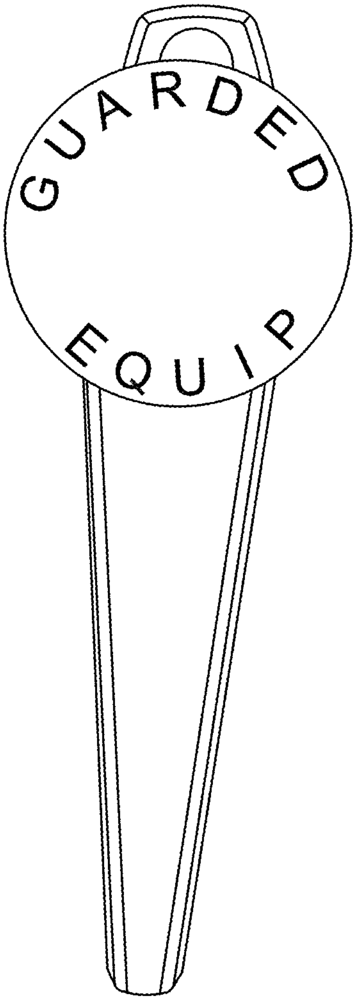
FIG. 3 is a front view of an equipment cabinet door handle with a key cover placed on the handle of FIG. 1, according to an example of the present invention.
Figure 4:
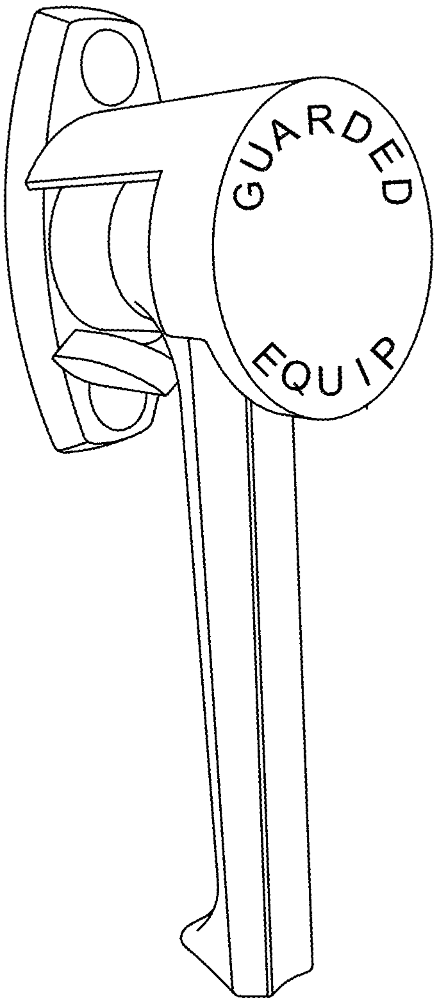
FIG. 4 is a side view of the equipment cabinet door handle with the key cover of FIG. 3, according to an example of the present invention.

FIG. 3 is a front view, and FIG. 4 is a corresponding side view of an equipment cabinet door handle with a key cover placed on the handle of FIG. 1, according to one aspect of the present invention.

Figure 5:
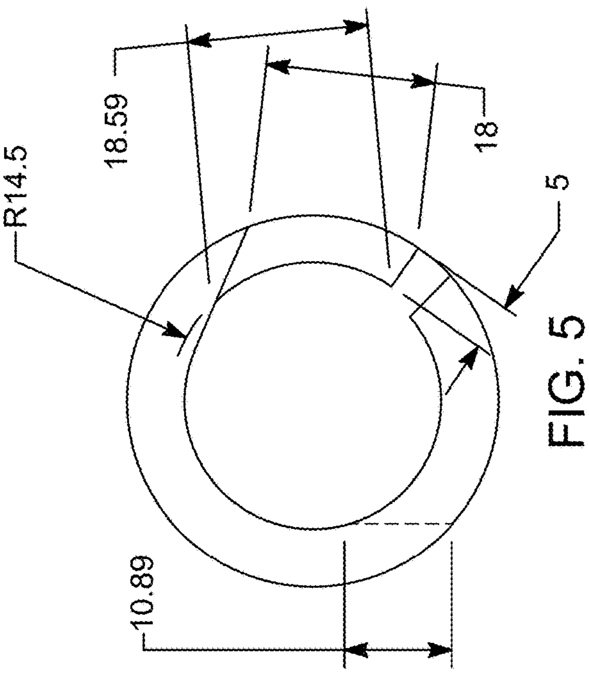
FIG. 5 is a mechanical line drawing of a top view of the key cover of FIG. 3, according to an example of the present invention.
Figure 6:
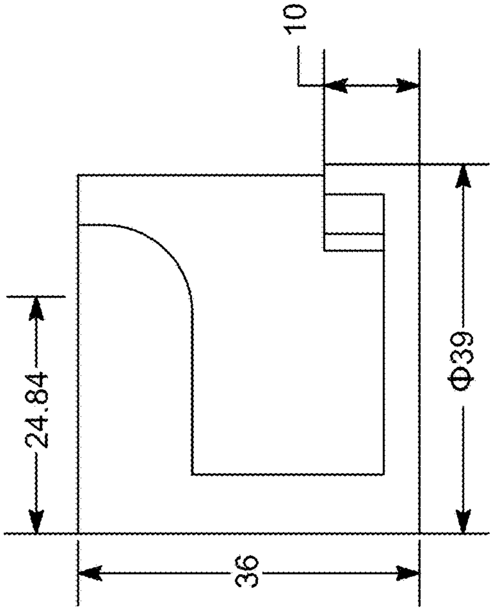
FIG. 6 is a mechanical line drawing of a first side view of the key cover of FIG. 3, according to an example of the present invention.
Figure 7:
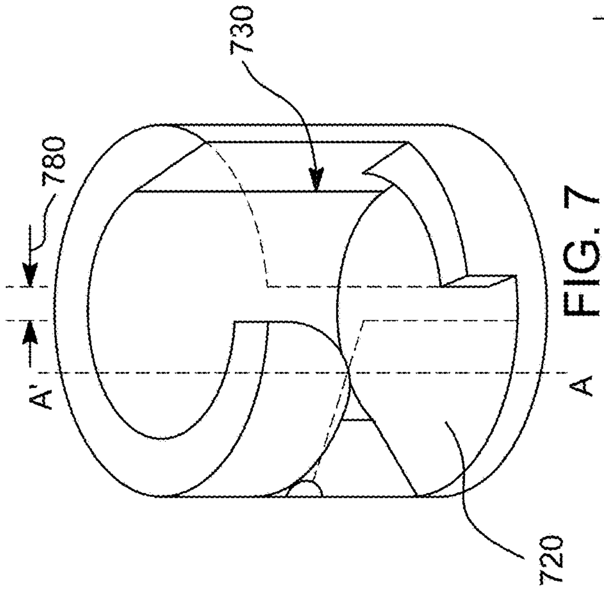
FIG. 7 is a mechanical solid surface drawing of a second side perspective view of the key cover of FIG. 3, according to an example of the present invention.
Figure 8:
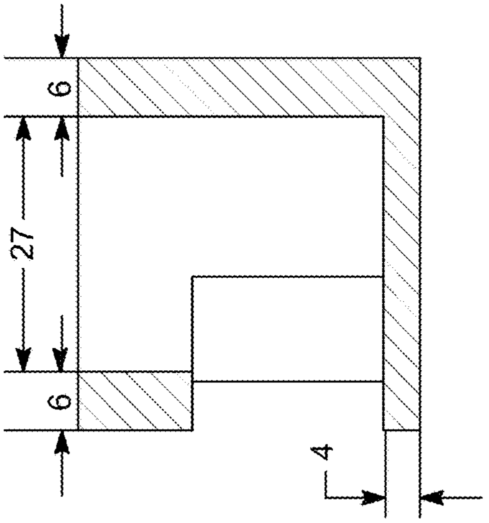
FIG. 8 is a cross-sectional mechanical line drawing taken along A-A' of FIG. 7, according to an example of the present invention.
Figure 9:
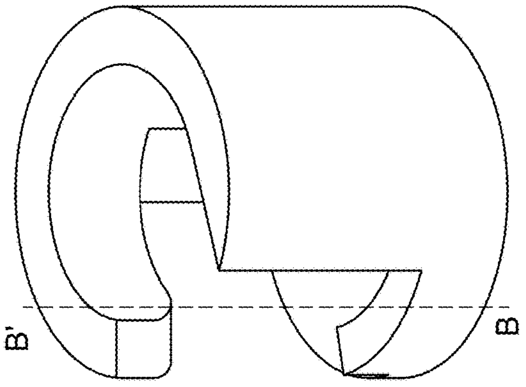
FIG. 9 is a mechanical solid surface drawing of a third side perspective view of the key cover of FIG. 3, according to an example of the present invention.
Figure 10:
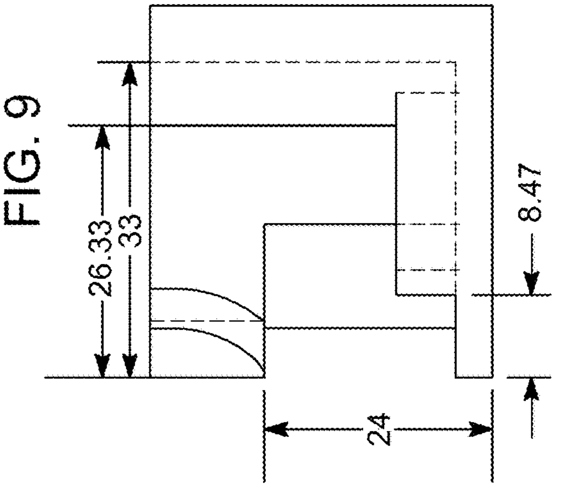
FIG. 10 is a cross-sectional mechanical line drawing taken along B-B' of FIG. 9, according to an example of the present invention.

FIG. 5, FIG. 6, FIG. 8, and FIG. 10 are mechanical line drawings from various perspectives of the key cover of FIG. 3. Example dimensions are shown in millimeters but other dimensions are possible within the true scope and spirit of the present invention. More specifically, FIG. 5 is a top view, FIG. 6 is a first side view, FIG. 8 is a cross-sectional view taken along A-A of FIG. 7 as shown, and FIG. 10 is a cross-sectional view taken along B-B of FIG. 9.

FIG. 7 is a mechanical solid surface drawing of a second side perspective view and FIG. 9 is a mechanical solid surface drawing of a third side perspective view of the key cover of FIG. 3.

Equipment Cabinet Door Handle Key Cover—Detailed View

Figure 11:
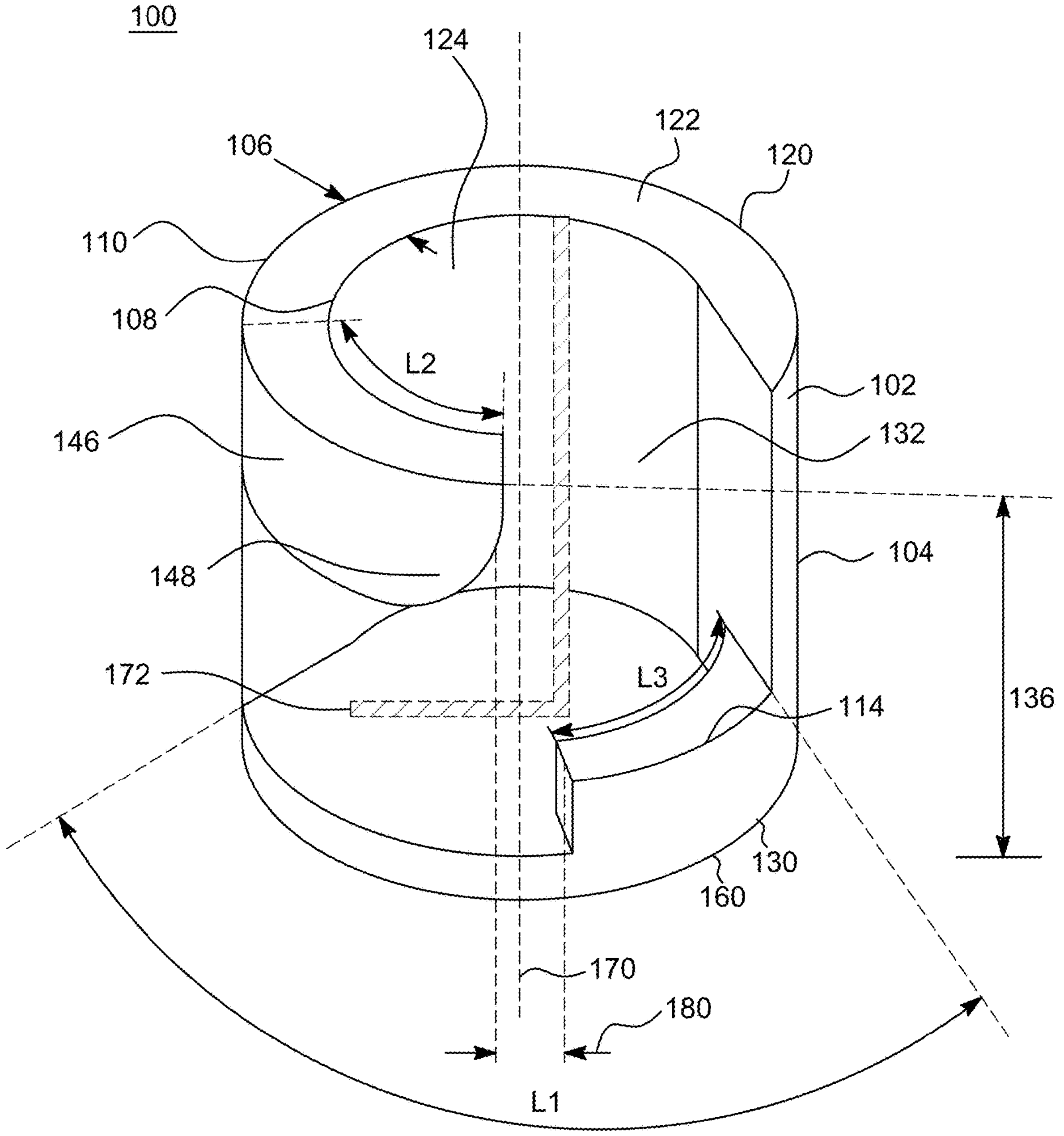
FIG. 11 is an enlarged mechanical solid surface drawing of FIG. 7, according to an example of the present invention.

FIG. 11 is an enlarged mechanical solid surface drawing of FIG. 7 illustrating the Equipment Cabinet Door Handle Key Cover 100. The Equipment Cabinet Door Handle Key Cover 100 can be fabricated from any material, including plastic, metal, composites, wood, and more. The Equipment Cabinet Door Handle Key Cover 100 can be fabricated using additive manufacturing processes, such as 3-D printing, or molded or cut from a solid cylindrical piece. In one example, the Equipment Cabinet Door Handle Key Cover 100 is fabricated in one piece. In another example, Equipment Cabinet Door Handle Key Cover 100 is manufactured in two or more pieces.

The Equipment Cabinet Door Handle Key Cover 100 is formed with the novel shape as described herein to firmly attach to the handle of FIG. 1 with a simple rotation motion of the hand in a clockwise direction. Likewise, the Equipment Cabinet Door Handle Key Cover 100 can be removed in a counterclockwise direction. Although other configurations can be used, clockwise rotation to fasten is preferred in most applications for a combination of practical and historical reasons. These reasons include natural hand motion: The majority of people are right-handed, and the natural motion of turning a screw or bolt with the right hand is clockwise. This makes it easier to tighten a fastener using the dominant hand, providing better control and applying more force effectively. Another reason is consistency and standardization. Clockwise rotation provides a consistent direction for tightening and loosening components. This reduces confusion and the potential for errors, especially in critical applications like machinery and infrastructure.

Figure 12:
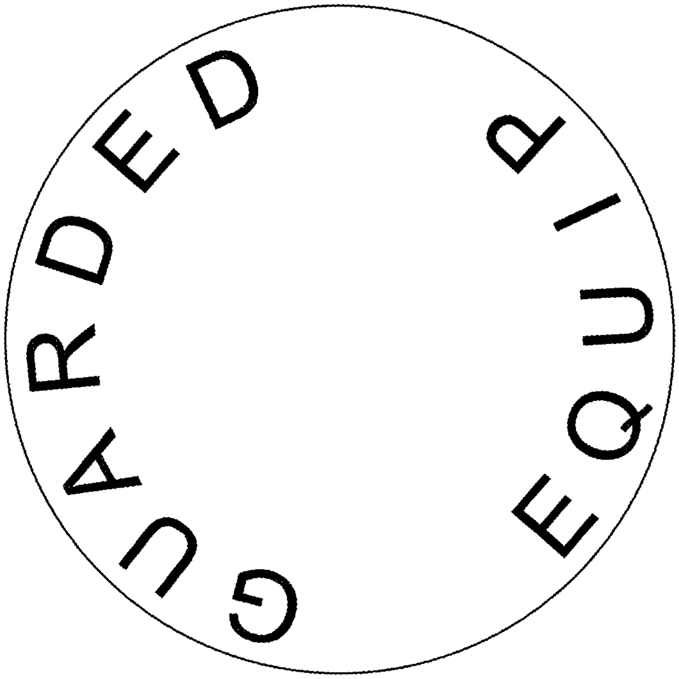
FIG. 12 is a top plan drawing of the key cover of FIG. 3, according to an example of the present invention.

Equipment Cabinet Door Handle Key Cover 100 includes a hollow cylindrical-shaped body 102 with a circumferential sidewall 104 of a given perimeter, a top end 120, and a bottom end 130. The top end 120 has an axial opening 124, therein forming a top rim 122 and defining circumferential sidewall thickness 106 between an inner radius 108 and an outer radius 110. The inner radius 108 is smaller than the outer radius 110. The circumferential sidewall 104 having a substantially rectangular-shaped opening 132 formed within the circumferential sidewall 104. The substantially rectangular-shaped opening 132, with a first arcuate length L1 and a height 136, as shown. A top portion 120 of the circumferential sidewall 104 at the top end 120 forming a finger 146 protrusion with a fingertip 148 with a second arcuate length L2 into the substantially rectangular-shaped opening 132. A bottom portion of the circumferential sidewall 104 at the bottom end 130 forms a curb 114 with a third arcuate length L3 in the substantially rectangular-shaped opening 132. The arithmetic sum of the second arcuate length L2 and the third arcuate length L3 is less than or equal to the first arcuate length L1. A cap 160 is formed on the bottom end 130. The cap 130 and the hollow cylindrical-shaped body 102 can be formed as one unitary piece or formed from two or more separate pieces. If the cap 130 is formed separately from the hollow cylindrical-shaped body 102, it can be attached using glue, sonic welding or other fastening means. As shown in FIG. 3, the cap 160 may have writing on the outside and be made of a bright color, such as yellow, orange, red, etc., for emphasis. Moreover, the outer surface of the cap (160) may include a text, such as a warning text, "Guarded Equipment" or any other text as shown in FIG. 3, FIG. 4 and FIG. 12 as described below.

The following is an alternate description of the rectangular-shaped opening 132 with a first arcuate length L1, height 136, and finger 146. The circumferential sidewall 104 has a substantially mirror-image L-shaped opening 172 parallel to a centerline 170 formed within the top rim 122 with a first acuate length L1. A portion of the circumferential sidewall 104 at the top end forming a finger 146 protrusion with a fingertip 148 with a second arcuate length L2 into the substantially mirror-image L-shape opening 172, and a portion of the circumferential sidewall 104 at the bottom end 130 forming a curb 114 with a third arcuate length L3 in the substantially mirror-image L-shaped opening 172, the third arcuate length L3 of the curb 114 is non-overlapping 180 with the second arcuate length L2 defining an arcuate position of the fingertip 148.

Another alternate description of the Equipment Cabinet Door Handle Key Cover 100 is summarized, referring to FIG. 7, along with FIG. 11. As shown in FIG. 7, there are two substantially rectangular circumferential sidewall shapes 720 and 730 separated by a radial distance 780. Rectangular circumferential sidewall shape 720 is disposed at the bottom end 130, as shown. It forms finger 146, as shown. The rectangular circumferential sidewall shape 730 is disposed at the top end 120, and it forms curb 114, as shown.

Equipment Cabinet Door Handle Key Cover—Various Perspective Views

Figure 13:
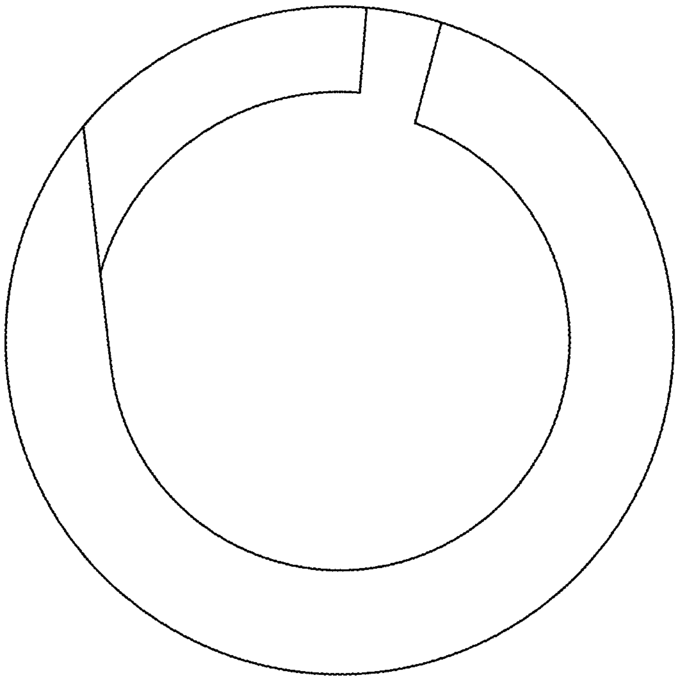
FIG. 13 is a bottom plan drawing of the key cover of FIG. 3, according to an example of the present invention.

Various perspective drawings of the equipment cabinet door handle with the key cover of FIG. 3 through FIG. 11 are now described. FIG. 12 is a top plan drawing, and FIG. 13 is a bottom plan drawing of the key cover of FIG. 3.

Figure 15:
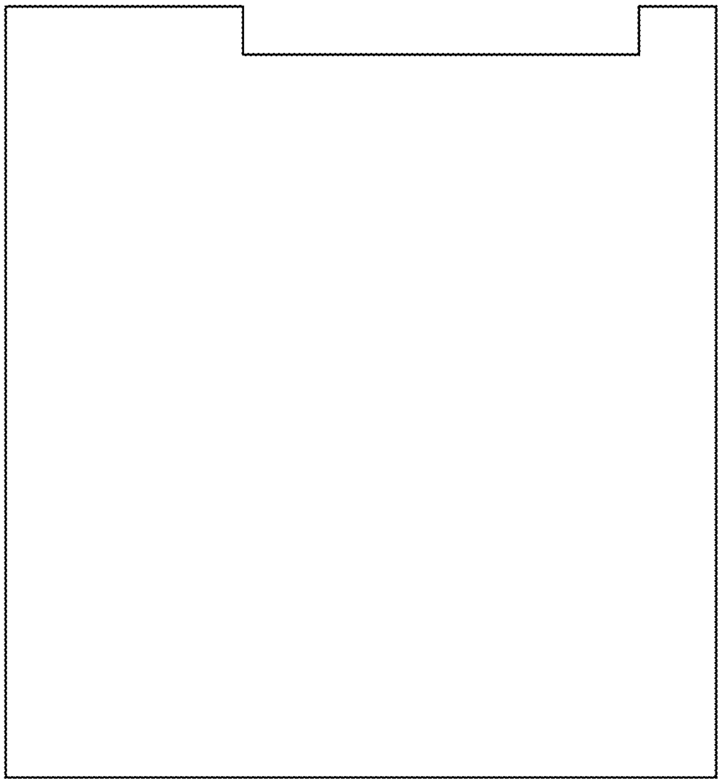
FIG. 15 is a back elevational drawing of the key cover of FIG. 3, according to an example of the present invention.
Figure 14:
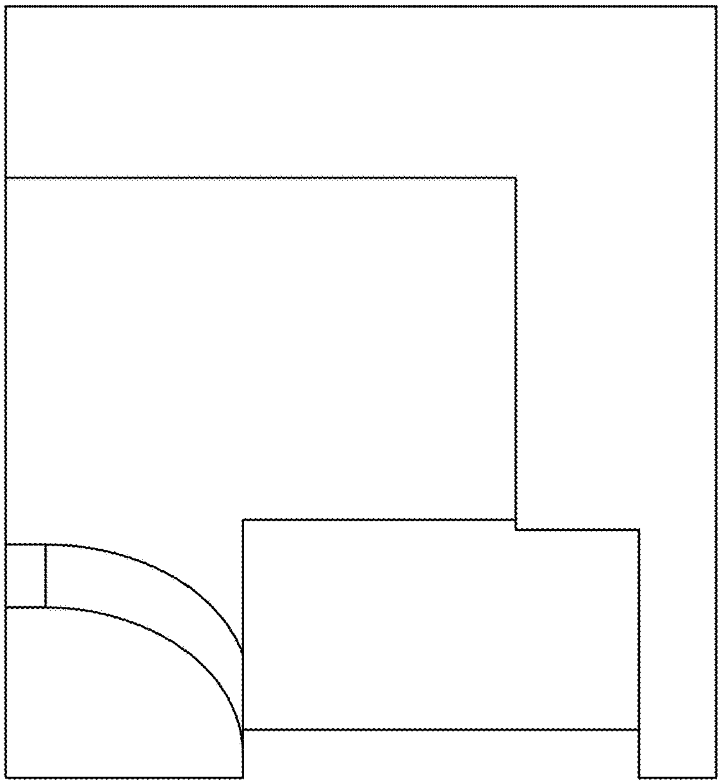
FIG. 14 is a front elevational drawing of the key cover of FIG. 3, according to an example of the present invention.

FIG. 14 is a front elevational drawing, and FIG. 15 is a back elevational drawing of the key cover of FIG. 3.

Figure 17:
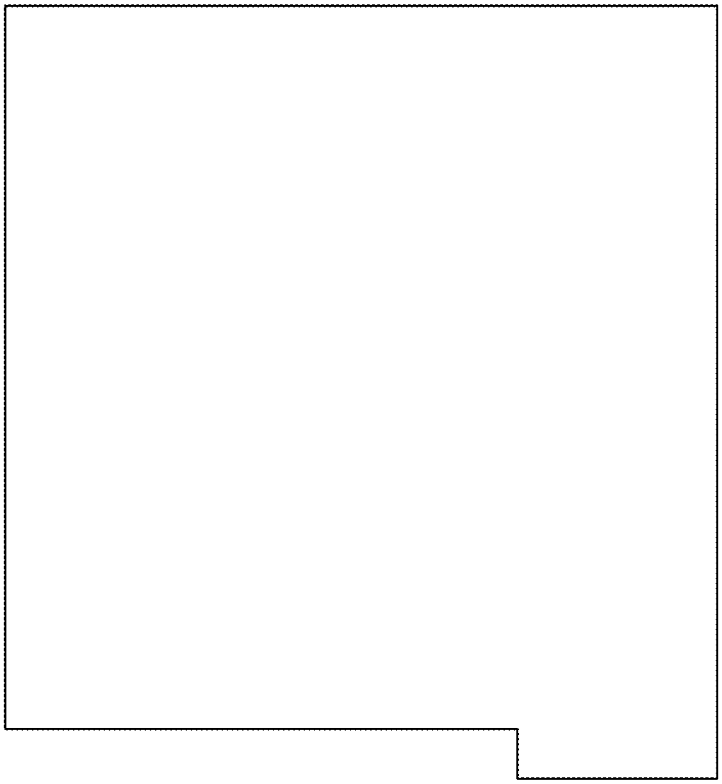
FIG. 17 is a right side elevational drawing of the key cover of FIG. 3, according to an example of the present invention.
Figure 16:
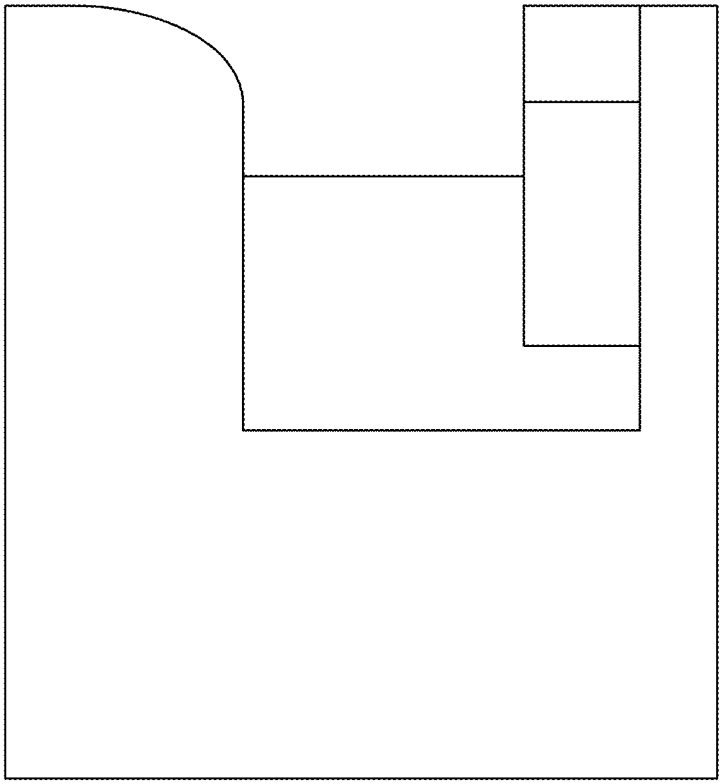
FIG. 16 is a left side elevational drawing of the key cover of FIG. 3, according to an example of the present invention.

FIG. 16 is a left side elevational drawing, and FIG. 17 is right side elevational drawing of the key cover of FIG. 3.

Non-Limiting Examples

Although specific examples of the subject matter have been disclosed, those having ordinary skill in the art will understand that changes can be made to the specific examples without departing from the spirit and scope of the disclosed subject matter. The scope of the disclosure is not to be restricted, therefore, to the specific examples, and it is intended that the appended claims cover any and all such applications, modifications, and examples within the scope of the present disclosure.

What is claimed is:

1. An equipment cabinet door handle key cover comprising:

a hollow cylindrical-shaped body with a circumferential sidewall, a top end, and a bottom end, the top end having an axial opening therein forming a top rim and defining sidewall thickness between an inner radius and an outer radius, the inner radius is smaller than the outer radius, the circumferential sidewall having a substantially rectangular-shaped opening with a first arcuate length, a top portion of the circumferential sidewall at the top end forming a finger protrusion with a fingertip with a second arcuate length in the substantially rectangular-shaped opening, and a bottom portion of the circumferential sidewall at the bottom end forming a curb with a third arcuate length in the substantially rectangular-shaped opening, wherein a sum of the second arcuate length and the third arcuate length is less than or equal to the first arcuate length; and a cap formed on the bottom end of the hollow cylindrical-shaped body.

2. The equipment cabinet door handle key cover of claim 1, wherein the hollow cylindrical-shaped body and the cap are formed as a unitary piece using a single mold.

3. The equipment cabinet door handle key cover of claim 1, wherein the hollow cylindrical-shaped body and the cap are formed as a unitary piece using additive print manufacturing.

4. The equipment cabinet door handle key cover of claim 1, wherein the hollow cylindrical-shaped body and the cap are formed in two or more pieces.

5. The equipment cabinet door handle key cover of claim 1, are formed from one of plastic, metal, wood, or a combination thereof.

6. The equipment cabinet door handle key cover of claim 1, wherein the cap includes an outer surface which is one of yellow color, orange color, red color or a combination.

7. The equipment cabinet door handle key cover of claim 1, wherein the cap includes an outer surface including text.

8. An equipment cabinet door handle key cover comprising:

a hollow cylindrical-shaped body with a circumferential sidewall of a given perimeter, a top end, and a bottom end, the top end having an axial opening therein forming a top rim and defining sidewall thickness between an inner radius and an outer radius, the inner radius is smaller than the outer radius, the circumferential sidewall having a substantially mirror-image L-shaped opening formed within the top rim with a first acuate length, a portion of the circumferential sidewall at the top end forming a finger protrusion with a fingertip with a given arcuate length into the substantially mirror-image L-shaped opening, and a portion of the circumferential sidewall at the bottom end forming a curb with an arcuate length in the substantially mirror-image L-shaped opening, the arcuate length of the curb is non-overlapping with an arcuate position of the fingertip; and a cap formed on the bottom end.

9. The equipment cabinet door handle key cover of claim 8, wherein the hollow cylindrical-shaped body and the cap are formed as a unitary piece using a single mold.

10. The equipment cabinet door handle key cover of claim 8, wherein the hollow cylindrical-shaped body and the cap are formed as a unitary piece using additive print manufacturing.

11. The equipment cabinet door handle key cover of claim 8, wherein the hollow cylindrical-shaped body and the cap are formed in two or more pieces.

12. The equipment cabinet door handle key cover of claim 8, are formed from one of plastic, metal, wood, or a combination thereof.

13. The equipment cabinet door handle key cover of claim 8, wherein the cap includes an outer surface which is one of yellow color, orange color, red color or a combination thereof.

14. The equipment cabinet door handle key cover of claim 8, wherein the cap includes an outer surface includes warning text.

15. An equipment cabinet door handle key cover comprising:

a hollow cylindrical-shaped body with a circumferential sidewall, a top end, and a bottom end, the top end having an axial opening therein, a first substantially rectangular circumferential sidewall shape is formed at the bottom end of the hollow cylindrical-shaped body to form finger protrusion at the top end, a second substantially rectangular circumferential sidewall shape is formed at the top end of the of the hollow cylindrical-shaped body to form a curb near the bottom end, the first substantially rectangular circumferential sidewall shape and the second substantially rectangular circumferential sidewall shape are separated by a radial distance; and a cap formed on the bottom end of the hollow cylindrical-shaped body.

16. The equipment cabinet door handle key cover of claim 15, wherein the hollow cylindrical-shaped body and the cap are formed as a unitary piece using a single mold.

17. The equipment cabinet door handle key cover of claim 15, wherein the hollow cylindrical-shaped body and the cap are formed as a unitary piece using additive print manufacturing.

18. The equipment cabinet door handle key cover of claim 15, wherein the hollow cylindrical-shaped body and the cap are formed in two or more pieces.

19. The equipment cabinet door handle key cover of claim 15, are formed from one of plastic, metal, wood, or a combination thereof.

20. The equipment cabinet door handle key cover of claim 15, wherein the cap includes an outer surface which is one of yellow color, orange color, red color or a combination thereof.

* * * * *